United States Patent [19]

Laird

[11] Patent Number: 5,066,474

[45] Date of Patent: Nov. 19, 1991

[54] METHOD FOR SULFUR DIOXIDE PRODUCTION FROM CALCIUM SULFATE BY ENTRAINED HIGH-TEMPERATURE SLAGGING REDUCTION

[75] Inventor: Douglas H. Laird, San Diego, Calif.

[73] Assignee: Science Ventures, Inc., San Diego, Calif.

[21] Appl. No.: 450,028

[22] Filed: Dec. 13, 1989

Related U.S. Application Data

[63] Continuation-in-part of Ser. No. 192,338, May 10, 1988, abandoned, which is a continuation-in-part of Ser. No. 8,763, Jan. 30, 1987, abandoned.

[51] Int. Cl.$^5$ .............................................. C01B 17/50
[52] U.S. Cl. ............................. 423/541 R; 423/168; 423/171; 423/178; 423/555; 423/539
[58] Field of Search ............... 423/539, 555, 171, 172, 423/168, 178, 542, 541 R, 638; 48/197 R, 210, DIG. 2; 201/12, 16, 20, 25; 106/109, 117

[56] References Cited

U.S. PATENT DOCUMENTS

| | | | |
|---|---|---|---|
| 2,232,099 | 2/1941 | de John | 423/541 |
| 3,717,700 | 2/1973 | Robison | 423/168 |
| 4,312,842 | 1/1982 | Nilson et al. | 423/322 |
| 4,503,018 | 3/1985 | Gardner et al. | 423/178 |
| 4,523,532 | 6/1985 | Moriarty et al. | 110/342 |
| 4,582,005 | 4/1986 | Brown | 110/263 |
| 4,707,163 | 11/1987 | Gudymov et al. | 48/73 |
| 4,744,969 | 5/1988 | Marten et al. | 423/541 |
| 4,774,064 | 9/1988 | Arnold et al. | 423/168 |

*Primary Examiner*—Anthony McFarlane
*Attorney, Agent, or Firm*—Dressler, Goldsmith, Shore, Sutker & Milnamow, Ltd.

[57] ABSTRACT

A method for production of sulfur dioxide from calcium sulfate by high temperature thermal reduction. Calcium sulfate, preferably in the form of calcined phosphogypsum, is desulfurized using a fossil fuel as a heat source, the combustion products resulting therefrom being used as a reductant. The fuel and reductant may be coal, coke, liquid hydrocarbons or natural gas; high sulfur, medium or low rank coal is preferred. The fuel is combusted with air or oxygen-enriched air. The solid feeds are introduced as finely-divided particles entrained in reactant gases, and the temperature is sufficiently hot to cause residual processed materials to melt and drain from the reaction vessel in the form of a liquid slag, yet not hot enough to produce significant amounts of fine silicon oxide dust. Iron pyrite, sand and/or clay can be added to reduce the slag melting point and to control its viscosity.

21 Claims, 3 Drawing Sheets

FIG. 1

METHOD FOR SULFUR DIOXIDE PRODUCTION FROM CALCIUM SULFATE BY ENTRAINED HIGH-TEMPERATURE SLAGGING REDUCTION

CROSS-REFERENCE TO RELATED APPLICATIONS

This application is a continuation in part of U.S. patent application Ser. No. 192,338, which was filed May 10, 1988, now abandoned, which application, in turn, is a continuation-in-part of Ser. No. 008,763, filed Jan. 30, 1987, now abandoned.

BACKGROUND OF THE INVENTION

1. Field of the Invention

This invention relates to thermal reduction of calcium sulfate to produce sulfur dioxide and a useful solid byproduct and, more particularly, to the reduction of calcined phosphogypsum using a fossil fuel to make sulfuric acid and slag for use as aggregate.

2. Discussion of Prior Art

Phosphogypsum is an unwanted byproduct of the manufacture of phosphoric acid for fertilizer using a wet process. For many years, fertilizer producers have been seeking a means to recover sulfur from this byproduct to make sulfuric acid to be recycled into the wet process. Steady accumulation of phosphogypsum in huge "gyp stacks" can thereby be avoided and the existing accumulation reduced. Furthermore, by recovering sulfur from the byproduct, the high cost of sulfur used to make sulfuric acid can be avoided.

Numerous processes have been developed over the years to free the sulfur trapped within calcium sulfate in the phosphogypsum. The prior art processes are flawed in that they either do not recover sufficient $SO_2$ from the phosphogypsum, are energy inefficient, or do not yield a useable solid end product. One example of a prior art process is French Patent 1,437,484, which discloses using electrolysis for reduction of the phosphogypsum. Bacterial action and intermediate-temperature thermal reduction to calcium sulfide, followed by reaction with water and carbon dioxide is disclosed in Starnes, E. M., Chairman *Florida Institute of Phosphate Research Priorities* (August 1985). South African Patent 68/5571 to Dorr-Oliver discloses using carbon monoxide and hydrogen as reducing gases. U.S. Pat. Nos. 3,087,790; 3,260,035; 3,607,045 and 4,102,989 to Wheelock describe a process for the high-temperature thermal reduction of phosphogypsum to quick lime, and high-temperature thermal reduction of phosphogypsum to lime-related products such as Portland cement.

Various processes for the high-temperature thermal reduction of phosphogypsum to lime or lime-related products have received the greatest development effort. U.S. Pat. No. 4,774,064 to Arnold et al. teaches combusting fuel with gypsum dispersed in a gas stream, thereby subjecting the calcium sulfate mineral to temperatures in excess of 3400° F. The particles are allowed to fall through this downward-flowing gas in a drop tube reactor. All of the fuel is burned to provide process heat. Arnold et al. prevents slag deposition on the walls of the reactor by maintaining a boundary layer of inert gas adjacent thereto. Arnold et al. views the prevention of slag buildup as an advantage of his process and an improvement over the prior art.

Without a slag layer to bring different particle types into contact, extend their retention time and thus help complete the requisite chemical reactions, extreme temperatures are required by Arnold et al. for adequate conversion. The flame zone of Arnold et al. is at 2440° C. Consequently, fuel requirements are high. Significant amounts of costly oxygen, without which such high reaction temperatures probably cannot be reached, are also required by this process.

Other prior art high-temperature thermal processes for the conversion of calcium sulfate to cement clinker include the Mueller Kuhne cement process, which was demonstrated in Germany during World War I, when importation of Spanish pyrites was cut off. This rotary kiln process produced cement clinker as the solid, calcium-containing byproduct, in addition to sulfur dioxide for making sulfuric acid. That technology was the foundation for what is now known as the OSW-Krupp process, practiced commercially in South Africa and in Austria. Related plants are in use in Poland and in East Germany. These are the only commercial units known to be still in operation for production of sulfur dioxide from the various forms of calcium sulfate. There are none in the United States. The disadvantages of the rotary kiln process are residence times in excess of six hours at temperatures of typically 2700° F., thereby consuming about 21 million BTU's per ton of cement clinker produced.

Besides the rotary kiln, various other reactor configurations have been developed, or are being tried experimentally, for high-temperature thermal reduction. These include the two fluidized bed stages disclosed in South African Patent 68/5571, which is designed to avoid prevent the build-up of slag and to produce solid calcium sulfide (CaS) by strong reduction in conventional bubbling fluidized beds.

SUMMARY OF THE INVENTION

Sulfur dioxide is recovered from calcined phosphogypsum or other particulate materials containing calcium sulfate or dehydrated calcium sulfate by high-temperature decomposition in a mildly reducing atmosphere. The high temperature conversion is accomplished by spraying the calcium sulfate-containing particles into the vessel entrained in a gas stream together with oxygen-bearing gas and fuel to be combusted at a temperature sufficiently high for liquid slag to collect on the reaction vessel surface. Gaseous byproducts of the partial combustion act as reductants which liberate sulfur dioxide from the particles. The temperature in the vessel is preferably no more than about 1780° C. (3236° F.) thereby avoiding the production of significant amounts of silicon oxide dust. The amount of oxygen-bearing gas and fuel provided relative to the amount of calcium sulfate is determined by the operating temperature desired. A mineral flux agent is also entrained in the incoming gas stream to enable the slag to drain from the reaction vessel and be recovered for use as aggregate or be further processed to become cement clinker. Preferred mineral flux agents are sulfides of iron, silica-bearing sand, clay, and mixtures thereof. Sulfur dioxide-containing gas is recovered from the reaction vessel for further processing.

This invention produces $SO_2$ gas from calcium sulfate containing particles in a fuel efficient and economical process. To accomplish this, reactions are begun in a gas-particle suspension and are completed in a melt phase in the same vessel. The economics of the process are improoved by increasing the conversion rate of calcium sulfate to $SO_2$ gas and by producing a solid byproduct useful as aggregate.

Gypsum anhydride or natural gypsum may be used in place of, or in combination with, phosphogypsum as process feed. Other artificial materials, such as chemical gypsum, may also be substituted for phosphogypsum or natural gypsum in processes of this type. Flue gas desulfurization, citric acid manufacture, hydrofluoric acid manufacture, and, more recently, solution mining of boric acid yield chemical gypsum as a byproduct that can be utilized by this process.

Prior art processes have nearly always required a particle size enlargement, or pelletizing, step before reaction Capital and processing costs of this step contribute to the marginal profitability of these processes. Another object of this invention is therefore to process the normal particle size distribution typical of phosphogypsum, without the costs of either pelletizing, classifying, or pulverizing the phosphogypsum.

Solid feeds are continuously introduced in the fired reaction vessel by entrainment in reactant gases. Reduction is partially completed while particles are entrained in gas, and continues after they become stuck to a layer of liquid slag lining the reaction vessel. The slag layer is kept at a temperature sufficient to ensure that the slag remains liquid, and can thereby be drained from the reactor bottom, preferably by gravity feed. Most of the reduced particles leave the reactor in the slag, and a lesser fraction remains entrained in the product gas as ash. The heat absorbed during release of the sulfur dioxide is offset by the heat released by the combustion of part of the fuel with the oxygen in the gas stream.

Pyrite or similar iron sulfide, together with sand and/or clay, are added to the incoming stream to reduce the slag melting point, and (in the case of pyrite) to increase the sulfur content of the incoming material and provide additional fuel for combustion.

Feed nozzles or air jets may be designed to impart swirl to the entrained mixture, so as to promote particle deposition on the reactor walls. The combustion air may be enriched with oxygen which increases the conversion rate and concentration of sulfur dioxide in the product gas. The reaction vessel can be pressurized to increase production in a given reactor volume. When solid fuels such as coal are used, they are partially gasified to produce intermediates such as hydrogen and carbon monoxide, which account for reduction of suspended gypsum particles.

The process provides desirable sulfur dioxide concentrations in the product gas, flexibility in the choice of fuel and an environmentally safe aggregate. The process also permits the utilization of low-cost high sulfur coal as fuel, further enhancing the economics of the process.

DESCRIPTION OF THE PREFERRED EMBODIMENTS OF THE INVENTION

The following section includes discussions of theory and principles of this invention as they are currently understood, in addition to the usual descriptions of structure, function and methods of application.

Figure 1:
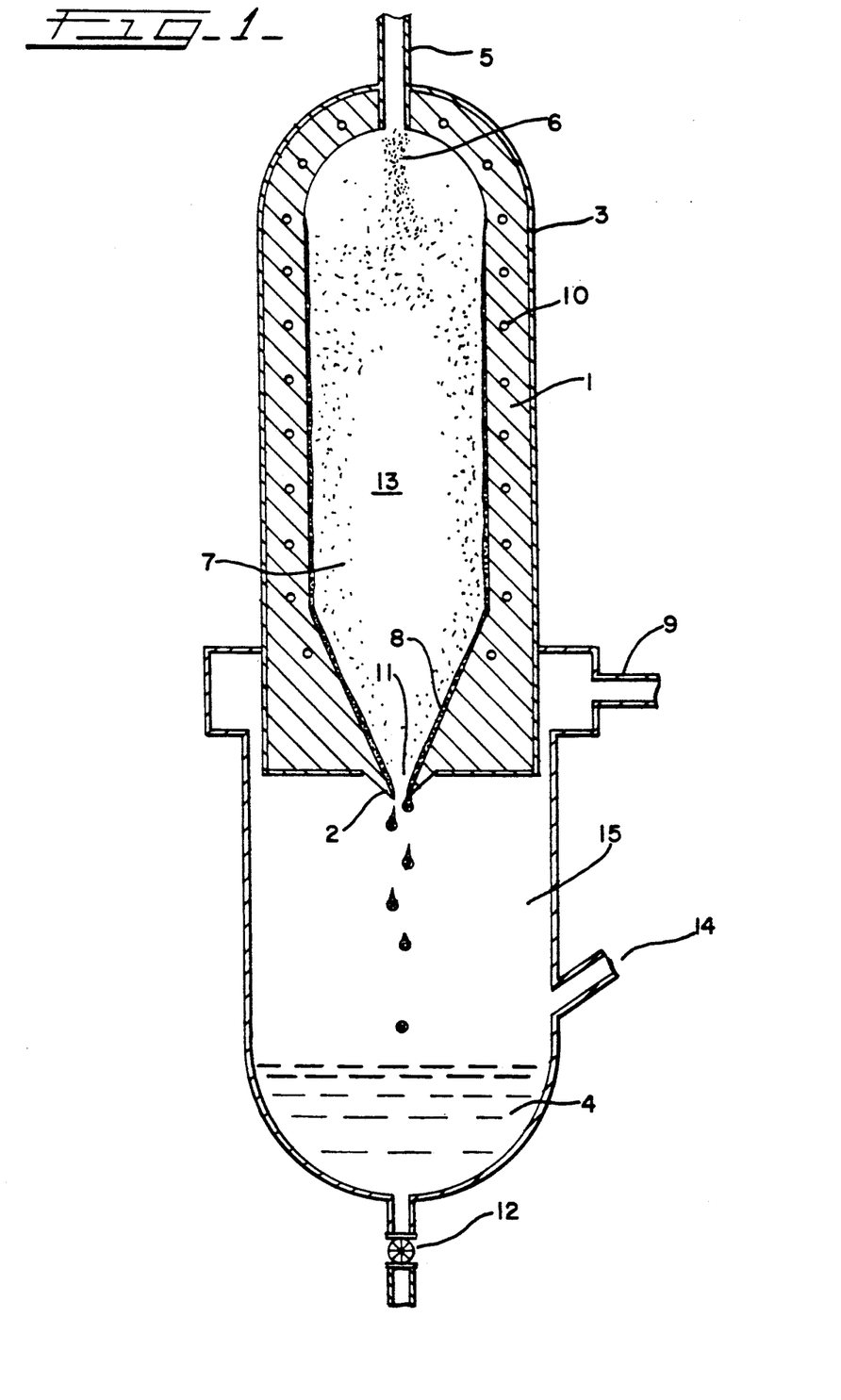
FIG. 1 is a vertical cross section of an operating reaction vessel suitable for carrying out the invention.
Figure 2:
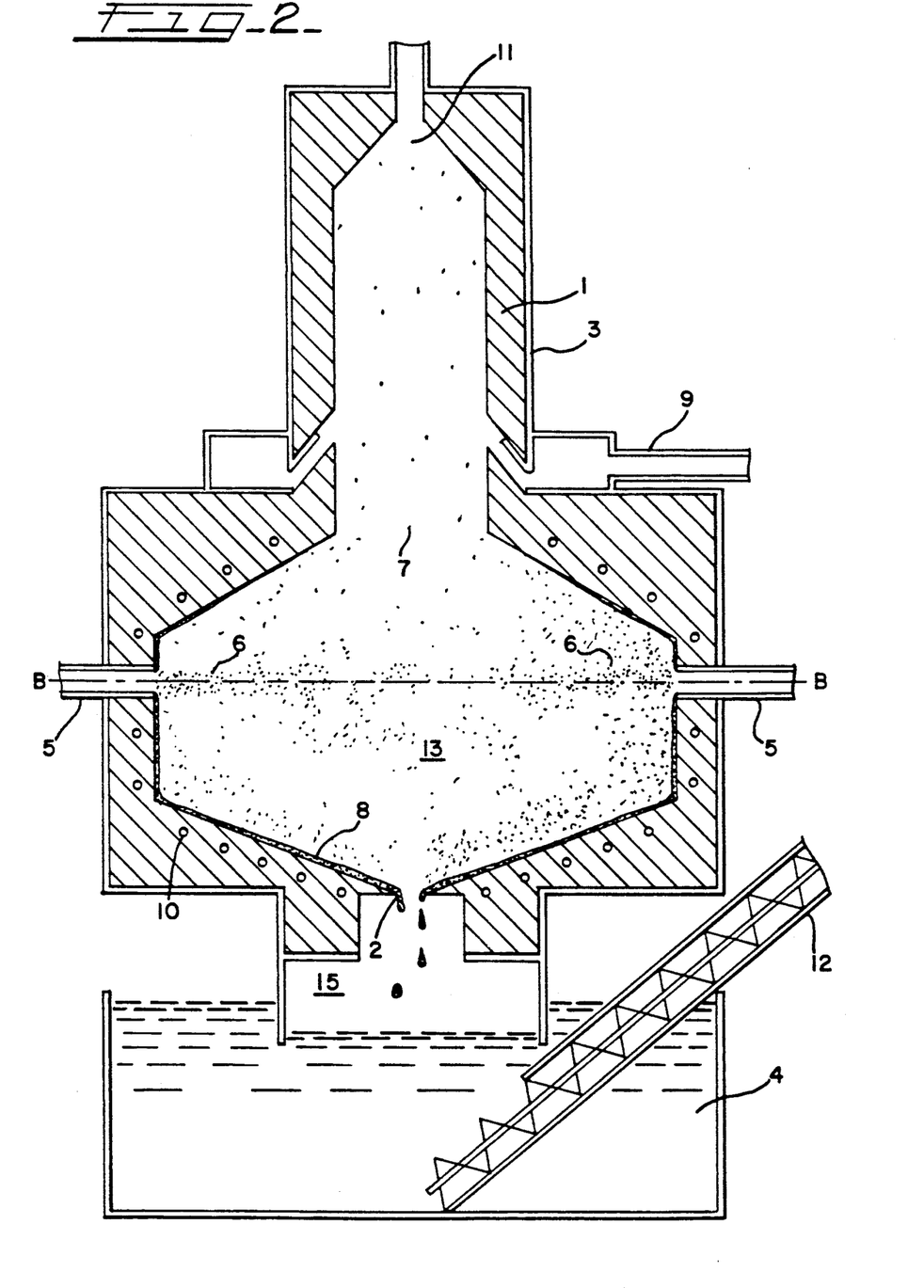
FIG. 2 is a vertical cross section of another operating reaction vessel suitable for carrying out the invention.
Figure 3:
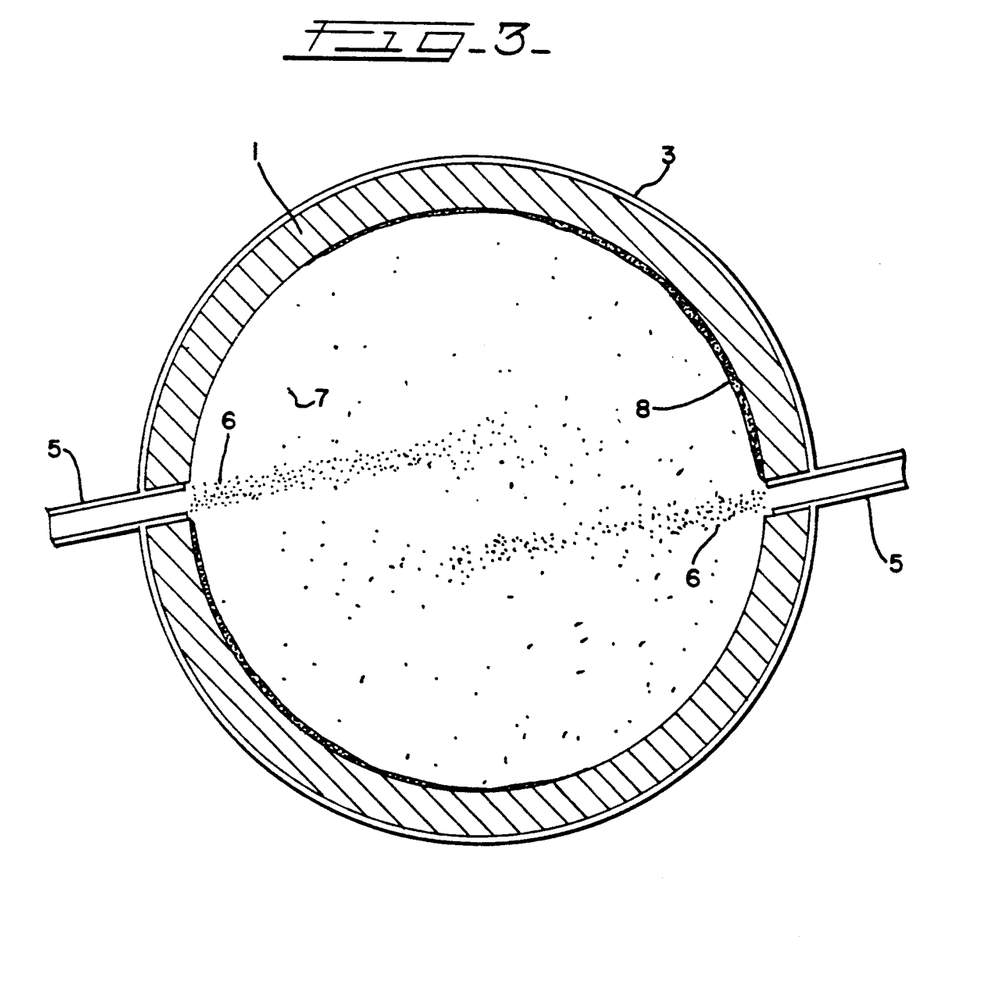
FIG. 3 is a plan view, in section, taken at line B—B in FIG. 2.

FIGS. 1 and 2 represent two of the many possible reaction vessel designs for carrying out the invention, according to the principles disclosed herein. Corresponding regions shown in FIGS. 1, 2 and 3 have identical numerals for components that have similar functions in the alternative designs. They illustrate alternatives of concurrent and countercurrent flow of product solids and gases.

The reaction vessel 13 is generally symmetrical about a vertical axis, e.g., a vertical cylinder with a refractory lining 1, which tapers to a relatively narrow central opening or "taphole" at the lower or bottom portion 2. Optionally, the bottom portion 2 can be a flat hearth with a central aperture therein. The condensed matter (slag) drains across the refractory surface by gravity in a molten and freely fluid state into a cavity below the reaction vessel 13 where it is collected. The reaction vessel internal cross section may be circular, square, or rectangular, or may, for example, include recesses for burner heads. The vessel is made gas tight by enclosure in a metal envelope 3 that surrounds the refractory lining 1 and defines a quench tank 15 below reaction vessel 13. If concurrent flow is practiced as shown in FIG. 1, the quench tank 15 is equipped with a vent means 14.

Product slag drains from the taphole 2 into a water quench 4. The liquid slag quickly solidifies and shatters into granules as it enters the water. Quench water temperature may be controlled for desirable aggregate size. Generally, cooler water provides smaller pieces of aggregate. Product aggregate is withdrawn through a star wheel feeder 12, as in FIG. 1, or a screw feeder 12, as in FIG. 2, or other conventional means for gastight removal of solids. Quench water that is lost to vaporization and from withdrawal of water with the aggregate is replaced with make-up water. The sour condensate from the downstream processing of product gas can be used as a source for this make-up water.

Solid reactants are introduced, together with reactant gases, at one or more burner nozzles 5 to form a relatively high-speed stream 6, preferably tangentially. A particle size range typical of commercial wet-process phosphogypsum is used. This particle size range is somewhat variable, but typically is such that roughly half of the feed mass would be retained on a sieve with 125 micron openings. The cost of crushing, sieving, or pelletizing phosphogypsum is thereby avoided. Moreover, these relatively small particles are far less subject to mass-transfer and heat-transfer rate limitations than the larger pelletized particles used in fluidized bed, circular grate, and vertical or rotary kiln processes. Small feed particle size is the fundamental reason for the rapid conversion rate. Turbulence from the nozzle causes rapid mixing, so that individual particles 7 become well dispersed in the gas. These fine particles are entrained in the sense that they are carried in suspension by the motion of the surrounding gas. The particle motion is therefore substantially affected by fluid dynamic drag forces. The particles, especially the relatively larger ones, are also affected to some extent by ballistic and gravitational forces.

Air, or other oxygen-bearing gas, is introduced at the burner nozzle or nozzles 5 for partial combustion of the fuel, i.e., a stoichiometric excess of carbonaceous fuel is introduced. The air can also be enriched with oxygen to increase the sulfur dioxide concentration in the exiting gas stream. Enough total oxygen is introduced to combust with the fuel so that the particles are heated to the reaction temperature, the heat required for the desulfurization reactions is provided, and any heat lost from the reaction vessel is offset. While in the flame zone of the burner, i.e., the zone at the burner where free oxygen is still present, the local temperature may exceed 1780° C.; however, the reaction vessel temperature remains below 1780° C.

An excess of fuel, which can be solid, liquid or gaseous, is provided beyond the amount required to provide heat to the process by the combustion of the fuel. Most of this excess fuel is used to reduce the calcium sulfate to calcium oxide or related materials, the reaction which liberates sulfur dioxide. The excess fuel is used to promote rapid conversion according to the law of mass action. Too great an excess must be avoided however, since it leads to unwanted sulfides in the aggregate. Depending on the reaction stoichiometry, excess carbon monoxide plus hydrogen preferably does not exceed about 5 to 10 volume percent of the product gas mixture for acceptable sulfide formation.

Illustrative carbonaceous fuels suitable for the present purposes are members of the group consisting of coal, coal-derived coke, combustible liquid hydrocarbons, petroleum coke, petroleum pitch, natural gas, combustible gases containing hydrogen and carbon monoxide, as well as mixtures thereof.

An excellent choice of fuel is a high-sulfur coal of low to intermediate rank, such as an Illinois #6, high volatile rank C bituminous (hvCb). Cost and other considerations being equal, fuels with low hydrogen/carbon ratios are preferred. Water vapor in the combustion product gas must be condensed before the product gas can be used in making sulfuric acid, and that inconvenience is minimized by use of low-hydrogen fuels.

Solid fuels should be chosen for high char reactivity, so the advantages of rapid conversion can be achieved. That is the reason the high-ranking coals are less suitable. This process can utilize low ranking Eastern hvCb coals despite the tendency of these coals to agglomerate, as their high char reactivity offers a desirable processing advantage. At high operating temperatures, volatile hydrocarbons emanating from the coal decompose so rapidly that adhesion and agglomeration of coal particles during the plastic stage do not occur. Thus, any coal can be used regardless of its caking property, ash content, or ash fusion temperature.

The calcium sulfate particles entrained in the bulk reactant gas react with hydrogen and carbon monoxide, combustion products of the fuel, liberating sulfur dioxide and leaving calcium oxide in the particle. At the same time, char (if solid fuel is used) is gasified by reaction with the combustion products These reactions can be represented approximately as:

$$CaSO_4 + CO \rightleftharpoons CaO + SO_2 + CO_2 \qquad (1)$$

$$CaSO_4 + H_2 \rightleftharpoons CaO + SO_2 + H_2O \qquad (2)$$

$$C + CO_2 \rightarrow 2CO \qquad (3)$$

$$C + H_2O \rightarrow CO + H_2 \qquad (4)$$

As calcium sulfate and char particles continue to react, they also migrate to the reactor walls. This migration is promoted by imparting a rotary flow to the reactants about the vertical axis. The swirl is provided by the design of the burner nozzles. A single axial nozzle may provide a swirling spray as in 5 of FIG. 1, or multiple nozzles may be aimed tangentially, off the reactor axis as illustrated by 5 in FIG. 3. Many conventional nozzle designs are available, either with or without swirl.

Centrifugal forces move the solids away from the axial gas exit and toward the refractory lining. Before being carried out with product gases, most of the particulate mass forms a layer of liquid slag 8 lining the refractory. Gas approaching the reaction vessel exit 11 spins faster due to conservation of angular momentum. Higher angular velocity and greater centrifugal force at the exit promotes deposition of particles still entrained in the gas on the refractory wall.

The particles pass through the burner jets in a fraction of a second, and may spend one to several seconds entrained in the bulk gas. The particles typically spend an even longer time in the slag layer before draining by gravity from the taphole. Particles in the slag react with one another, while continuing to react with the gas. Residence time in the slag greatly extends the time for the reaction to be completed for each particle, while occupying little of the reactor volume.

If sand or other $SiO_2$-containing particulate matter is included with the particle feed, it serves as a flux in the slag. These fluxing materials also lower the slag melting point, while moderating the viscosity thereof. Iron pyrite or related sulfides of iron (e.g. pyrrhotite or marcasite) provide the same effect, while also providing fuel value and additional sulfur. A greater proportion of sand may be introduced if higher viscosity is desired, or a greater proportion of pyrite may be introduced to reduce the viscosity. Clay or other mineral matter can be a substitute for or supplement to the sand and pyrite as slag fluxes.

Slag layer reactions are represented by equations (5) through (8).

$$CaSO_4 + CO + \tfrac{1}{2} SiO_2 \rightarrow \tfrac{1}{2} Ca_2SiO_4 + CO_2 + SO_2 \qquad (5)$$

$$10CaSO_4 + 2FeS_2 + 6SiO_2 \rightarrow Fe_2SiO_4 + 5Ca_2SiO_4 + 14SO_2 \qquad (6)$$

$$Ca_2SiO_4 + SiO_2 \rightleftharpoons 2CaSiO_3 \qquad (7)$$

$$Fe_2SiO_4 + SiO_2 \rightleftharpoons 2FeSiO_3 \qquad (8)$$

Of course, actual detailed reaction mechanisms may be more complicated, and the melt is really a complex equilibrium mixture of many ill-defined species. Reactions (5) through (8) should be viewed as representative of the product mix, and useful for thermodynamic evaluation.

These reactions (along with reactions 1-4 which continue in the slag layer) are all endothermic. They serve to moderate slag temperature and to protect the refractory by absorbing some of the heat of combustion of the fuel. Temperatures in the bulk gas must be kept substantially hotter than the temperature of the slag to provide the heat required to keep the slag fluid and to provide the heat necessary for the desired reactions to take place therein. Cooling coils 10 in the refractory may be provided to absorb any excess heat. A typical slag fluid temperature is roughly 1300° C. (2372° F.), depending on the composition. It is estimated that the bulk gas should be about 200° hotter than this. These high temperatures for the entrained mixture accelerate the reaction kinetics considerably.

It is also necessary to limit the peak reaction temperature, however, in order to prevent the formation of very fine dust which is hard to remove from the product gas. This fine dust can be formed when particles containing carbon char and SiO₂ happen to collide and agglomerate causing the following reaction to occur:

$$SiO_2 + C \rightarrow SiO + CO \tag{9}$$

The calculated thermochemical equilibrium of reaction (9) shifts rather abruptly from the condensed reactants toward the gaseous products at approximately 1670° to 1690° C. (3038° to 3074° F.). As product gases cool, the gaseous SiO is re-oxidized to form a very fine aerosol dust which remains suspended in the exit gaseous stream. Being hard to separate from product gases, this dust is a liability to downstream processing.

Because the heat of reaction for reaction (9) is endothermic with a value of −165 Kcal/mole, agglomerated carbon/SiO₂-containing particles must extract heat from the surrounding mixture for the reaction to proceed. The heat transfer leading to unwanted reaction (9) will not become significantly rapid until the surrounding mixture reaches a temperature that is about 100° C. hotter than the 1670°-1690° C. minimum vaporization temperature. Therefore the surrounding mixture temperature can be as hot as about 1780° C. (3236° F.) before excessive amounts of fine dust are formed. This defines an upper temperature limit for the operating conditions. This upper temperature limit is measurable by optical pyrometry. This temperature limit applies in the reactor vessel where char and SiO₂ particles can come together in the absence of free oxygen. Localized regions near burner heads may exceed 1780° C. without forming the dust, provided that free oxygen is present in these regions.

A temperature gradient from gas to slag to refractory lining provides for a degree of automatic control of slag flow. Slags produced by this process do not have exact melting points, but gradually soften and become more fluid with increasing temperature. If the slag inner surface is too cool to flow freely, material tends to accumulate on the refractory lining. As the slag layer becomes thicker, heat transfers more slowly through the slag layer to the refractory lining, and the slag inner surface temperature consequently increases. Soon, flow equilibrium is reestablished. Too hot a local slag surface temperature is self-correcting by the converse of this mechanism.

Cooling coils 10 shown in FIG. 1 and FIG. 2 produce the requisite temperature gradient for this slag-thickness regulating mechanism, and also protect the refractory.

Using fluxing agents as mentioned above it is preferred to introduce into the reaction vessel proportions of particulate solid reactants which result in product slag fluidity with a viscosity of no more than 150 poise at temperatures in the range of about 1200° to about 1500° C. (2192° F. to 2732° F.).

The slag, when cooled in the reactor bottom 15, produces a solid byproduct. The product is a fused, hard, dense, chemically inert, glassy material suitable for use as aggregate. Florida, where most phosphogypsum is produced in the United States, does not have hard natural rock for aggregate, making the market for this product extremely good in that area.

The product gas retains relatively small amounts of entrained particles as it leaves the reaction vessel. To avoid fouling or otherwise damaging the downstream equipment, the product gas must be cooled quickly. Particles will not collect in the downstream equipment at these lower temperatures. The product gas can be cooled by recirculating some of the cooled product gas at an annular inlet 9 so that the equipment internals are blanketed and protected by the cooler gas. Cooled product gas mixed with the recycled gas exits at a vent 14 above the quench water level in FIG. 1, or is vented at the reactor top portion 11 as shown in FIG. 2

This invention can accommodate natural gypsum and phosphogypsum as feed without prior dehydration or calcining. The heat required to dehydrate the gypsum in the reaction vessel must be offset by additional combustion. Driving off of the water, in turn, dilutes the product gas with combustion products and nitrogen, thereby reducing the sulfur dioxide concentration. Furthermore, the water vapor in the product gas must be condensed to liquid water and removed before the gas can be used to make sulfuric acid. When the water vapor is condensed, some of the sulfur dioxide in the product gas dissolves in the water and is lost. The sour water produced also presents a disposal problem. Therefore, prior calcination of gypsum to a reduced water content at a temperature of at least 150° C., or preferably to 200° C. or higher in a separate vessel is recommended.

Phosphogypsum also contains fluorine in various forms, much of which is released as gas during calcination. The common practice is to add lime before calcination of phosphogypsum to, among other purposes, inhibit the release of fluorides.

Release of fluorides during calcination is desirable in the present invention. Calcination reduces the amount of fluorine in the phosphogypsum, which might otherwise be released to the product gas in the form of hydrogen fluoride (HF). HF in the product gas is undesirable, because it poisons the catalyst in the sulfuric acid plant. It is preferred, when phosphogypsum is used as the source for calcium sulfate, to first calcine the feed in a separate processing unit at a temperature of at least 150° C.

EXAMPLE 1

Examples 1 through 3 are based on material and energy balance computations In these computations, sulfide-forming reactions and the water gas shift reaction are each assumed to approach equilibrium.

Phosphogypsum directly from the wet phosphoric acid process is dried and calcined in a direct-contact fluidized bed calciner After calcination, the phosphogypsum is fed into the reaction vessel, without particle size enlargement, reduction, or classification. Illinois #6 hvCb coal having a sulfur content of 6.7 percent, dry basis, is used as fuel. Fuel, iron pyrite, and sand are each pulverized to a fineness such that 50 percent by weight is retained on a 120 mesh sieve, and each is preheated before introduction to the reaction vessel. The heat required to preheat and dry the solid feeds, and that required to preheat the air, is provided by heat recovery from the product gas, using conventional heat exchanger technology. There is no heat recovery from the slag in this unpressurized example. The reactants are introduced at a burner nozzle 5 in the top of a reaction vessel configured as in FIG. 1. The refractory chamber is approximately 17 feet in inside diameter, and 60 feet high from nozzle to taphole. Feed and product temperatures and flow rates are tabulated below.

The sulfur dioxide produced, on further processing, yields 450 tons per day of 98 percent sulfuric acid.

Product slag from this feed mixture is freely fluid, and drains from the reaction vessel, at a temperature of 1300° C. (2372° F.). The slag is continuously removed by a star wheel feeder, as shown at 12 in FIG. 1.

Product gas exits the bottom taphole at a temperature around 1500° C. (2732° F.). It is cooled by recirculation at point 9 of an equimolar amount of product gas which has been cooled to 30° C. (86° F.) in downstream gas processing equipment. The resulting gas mixture exits at vent 14 at about 900° C. (1652° F.). Water condensed in downstream gas processing equipment is returned to the quench tank 4 in amounts sufficient to maintain a constant level.

TABLE 1

Example 1 and 2 Feed and Product Temperatures and Flows

| Feeds | Flows | Temperature (°C.) |
|---|---|---|
| Gypsum | 520 Tons/day | 300 |
| Coal | 98 Tons/day | 200 |
| Pyrite | 97 Tons/day | 600 |
| Sand | 125 Tons/day | 600 |
| Air | 16,000 Std. cubic feet/min. | 800 |
| Products | | |
| Aggregate | 387 Tons/day | 1300 |
| Gas | 19,260 Std. cubic feet/min | 1500 |

Product Gas Composition, Dry Basis

| Component | Percent by Volume |
|---|---|
| Carbon Monoxide | 1.5 |
| Hydrogen | 0.3 |
| Nitrogen | 66.0 |
| Carbon Dioxide | 13.0 |
| Sulfur Dioxide | 13.5 |

EXAMPLE 2

In this example, the reaction vessel configuration, feed and production rates are the same as in Example 1. All operating conditions are the same as in Example 1, except that the reaction vessel is pressurized to an absolute pressure of 45 atmospheres. Production rate is essentially proportional to both absolute pressure and vessel volume, so that a vessel 17 feet high from nozzle to taphole and with an inside diameter of five feet gives the same production as that quoted in Example 1.

Pressurization suppresses boiling of the quench water until it reaches temperatures much hotter than the normal boiling point Thus, useful high temperature heat may be recovered from product slag by exchanging heat with quench water. Steam useful for power production at a pressure of 600 PSIG may be produced.

EXAMPLE 3

In this example, the combustion air is enriched with oxygen to a concentration of 37.5 percent by volume. The reactor configuration, sulfur dioxide production, and all other conditions are the same as in Example 1, except as specified below.

Reactor dimensions required under these conditions are an internal height (nozzle to taphole) and diameter of 40 and 14 feet respectively. The product gas contains 25 percent sulfur dioxide by volume, on a dry basis. Feed and product flow rates are found in Table 2.

TABLE 2

Example 3 Feed and Product Flows

| Feeds | Flows |
|---|---|
| Gypsum | 524 Tons/day |
| Coal | 88 Tons/day |
| Pyrite | 118 Tons/day |

TABLE 2-continued

| Sand | 160 Tons/day |
|---|---|
| Air | 6,000 Std. cubic feet/min. |
| Oxygen | 1,660 Std. cubic feet/min. |
| Products | |
| Aggregate | 475 Tons/day |
| Gas | 10,740 Std. cubic feet/min |

Product Gas Composition, Dry Basis

| Species | Percent by Volume |
|---|---|
| Carbon Monoxide | 2.5 |
| Hydrogen | 0.5 |
| Nitrogen | 51.0 |
| Carbon Dioxide | 20.0 |
| Sulfur Dioxide | 25.0 |

EXAMPLE 4

This example is based on results of a series of laboratory experiments. A 2-liter cylindrical reaction vessel similar in shape to the reaction vessel of FIG. 1 was used. Florida phosphogypsum passing a 50 mesh sieve (394 micron opening) was partially dehydrated and was then premixed with ground coal, sand and pyrite in the proportions shown in Table 3. Analyses of the feed solids are given in Tables 4 through 6. The powder mixture was fed at room temperature through a single downward-directed nozzle. About half of the combustion air was used at the nozzle to disperse feeds. Oxygen enrichment and swirl were not used. The balance of the air entered at four openings surrounding the nozzle (not shown in FIG. 1).

The gas retention time in this test series ranged from 1 to 2.3 seconds, and the temperature ranged from 1255° to 1405° C. (2291° F. to 2561° F.) Temperatures were measured by optical pyrometer aimed at the center of the reaction vessel. Slag draining from the tap hole was collected on a water-cooled stainless steel surface instead of in water for purposes of sampling and analysis. Product gas was sampled at intervals for subsequent Orsat analysis.

Product slag hardness ranged from 5.5 to 6.5 on the Moh's hardness scale. The slag did not leach measurable sulfide content into acid rain water simulated with a pH 4 buffer. Optical microscopy and X-ray diffraction showed the slag to be about 95 percent glass, with quartz as the principal crystalline phase. Closed voids occupied fractions of the particle volume ranging from about 5 to 50 percent. Sulfide content ranged from undetectable to 0.3 percent.

The composition range for the product slag samples is given in Table 7. Based on the slag analyses, sulfur release averaged 99.6 percent and was never less than 98.8 percent of the total sulfur in feeds. Carbon utilization averaged 99.8 percent and was never less than 99.4 percent of total carbon in the feed coal. The iron content was used for comparison with feed compositions to compute these figures.

TABLE 3

Feed Proportions

| Material | Wt. Percent |
|---|---|
| Phosphogypsum, hemihydrate | 63.1 |
| Coal. hvCb, as received | 13.0 |
| Pyrite, Spanish | 11.3 |
| Sand, purified silica | 12.7 |

TABLE 4

| Gypsum Analysis | |
|---|---|
| Component | Wt. Percent |
| Calcium | 21.0 |
| Iron | 0.43 |
| Aluminum | 0.52 |
| Sulfate | 51.0 |
| Phosphate | 1.6 |
| Fluoride | 0.84 |
| Silica | 19.0 |
| Moisture | 5.6 |

TABLE 5

| Coal Analysis | |
|---|---|
| Component | Wt. percent dry |
| Carbon | 66.6 |
| Hydrogen | 3.63 |
| Nitrogen | 1.22 |
| Oxygen (diff) | 5.3 |
| Sulfur, organic | 1.8 |
| Pyrite, as $FeS_2$ | 8.2 |
| $CaSO_4$ | 1.6 |
| $SiO_2$ | 6.2 |
| Other minerals | 5.45 |

TABLE 6

| Pyrite Analysis | |
|---|---|
| Component | Wt. percent dry |
| Sulfur | 47.3 |
| Iron | 41.6 |
| $SiO_2$ | 5.1 |
| Other minerals | 2.4 |
| Moisture | 3.6 |

TABLE 7

| Product Slag Analyses, Wt. Percent | | | | |
|---|---|---|---|---|
| | Min. | Max. | Mean | No. Samples |
| Sulfate, as $SO_3$ | 0.02 | 1.7 | 0.56 | 7 |
| Carbon | 0.01 | 0.5 | 0.15 | 4 |
| Iron, as FeO | 16.4 | 18.8 | 18.2 | 7 |

The above discussion, examples and tables are intended by way of example only and are not intended to limit the invention in any way. Still other variants within the spirit and scope of the claimed invention will readily present themselves to those skilled in this art.

What is claimed is:

1. A method for producing sulfur dioxide from calcium sulfate-bearing reactants comprising:
combining in a fired reaction vessel an oxygen-bearing gas, fuel, and finely divided solid particles of a calcium sulfate-bearing reactant and of a mineral fluxing agent to form a mixture, the respective amounts of fuel and oxygen in said mixture being sufficient to support continuing combustion in said reaction vessel while maintaining a reducing atmosphere sufficient to desulfurize said calcium sulfate to sulfur dioxide; and to maintain a temperature in said reaction vessel sufficiently high to form and maintain liquid slag in said reaction vessel but lower than that causing formation of substantial amounts of dust containing oxides of silicon that remains suspended in exit gas stream;
draining from a bottom region of said reaction vessel said liquid slag; and
removing from said reaction vessel a sulfur dioxide containing gas.

2. The method of claim 1 wherein said fluxing agent includes sulfides of iron.

3. The method of claim 1 wherein said mineral fluxing agent is selected from the group consisting of sulfides of iron, silica-bearing sand, clay, and mixtures thereof.

4. The method of claim 3 wherein said mixture contains solid reactants in proportions which result in slag having a viscosity no more than about 150 poise at a temperature in the range of about 1200° C. to about 1500° C.

5. The method of claim 1 wherein said fuel is selected from the group consisting of coal, coal-derived coke, combustible liquid hydrocarbons, petroleum pitch, natural gas, petroleum coke, a combustible gas consisting essentially of hydrogen and carbon monoxide, and mixtures thereof.

6. The method of claim 1 wherein said reaction vessel is operated at a pressure greater than atmospheric.

7. The method of claim 1 wherein said calcium sulfate-bearing reactants are selected from the group consisting of natural gypsum, calcined phosphogypsum, calcined gypsum and mixtures thereof.

8. The method of claim 1 wherein said drained slag is deposited in water.

9. The method of claim 1 wherein said mixture is sprayed tangentially into said reaction vessel as at least two streams.

10. The method of claim 1 wherein said reaction vessel is generally symmetrical about a vertical axis, and wherein there is a central bottom opening for said slag and said gas to exit from said vessel.

11. The method of claim 7 wherein said phosphogypsum is derived from phosphoric acid production and is used without particle size alteration.

12. The method of claim 1 wherein said temperature in said reaction vessel is no more than about 1780° C.

13. A process for producing sulfur dioxide gas and a usable aggregate from calcium sulfate-containing particles comprising:
dispersing the calcium sulfate-containing particles into a reactant gas constituted by oxygen and a stoichiometric excess of carbonaceous fuel and forming a reactant gas stream having calcium sulfate-containing particles dispersed therein;
igniting the reactant gas stream to produce an ignited gas stream;
distributing the ignited gas stream into a reaction vessel so as to produce a sulfur dioxide-containing gas and a molten slag;
collecting the resulting molten slag on the inside surfaces of the reaction vessel;
maintaining the reaction vessel at a temperature of no more than about 1780° C. yet sufficient to maintain the resulting molten slag in a fluid state; and
removing from said reaction vessel the sulfur dioxide-containing gas as well as the collected slag.

14. The process according to claim 13 wherein the calcium sulfate-containing particles are selected from the group consisting of natural gypsum, calcined phosphogypsum, calcined gypsum and mixtures thereof.

15. The process according to claim 13 wherein the reactant gas stream also contains a mineral flux agent selected from the group consisting of mineral sulfides of iron, silica-bearing sand, clay and mixtures thereof.

16. The process according to claim 13 wherein the ratio of calcium sulfate-containing particles and flux agent is such that the produced molten slag has a viscosity of no greater than 150 poise at temperatures of about 1200° C. to about 1500° C.

17. The method of claim 13 wherein the carbonaceous fuel is selected from the group consisting of coal, coal-derived coke, combustible liquid hydrocarbons, petroleum pitch, natural gas, petroleum coke, combustible gas consisting essentially of hydrogen and carbon monoxide, and mixtures thereof.

18. The process of claim 13 wherein the reaction vessel is at a pressure greater than atmospheric.

19. The method of claim 13 wherein slag is collected by draining into water.

20. The method of claim 13 further comprising introducing the ignited gas stream into the reaction vessel tangentially.

21. The method of claim 13 wherein the reaction vessel has a generally cylindrical configuration with a lower portion substantially tapered downward and inward, the apex of the substantially tapered portion being the lowermost portion of said reaction vessel, an opening in the apex of said substantially tapered portion providing a means for the slag to drain from the vessel.

* * * * *